US012034226B2

(12) United States Patent
Lee et al.

(10) Patent No.: US 12,034,226 B2
(45) Date of Patent: *Jul. 9, 2024

(54) ANTENNA DEVICE AND ELECTRONIC DEVICE HAVING THE SAME

(71) Applicant: Samsung Electronics Co., Ltd., Suwon-si (KR)

(72) Inventors: Young-Ju Lee, Seoul (KR); Hyun-Jin Kim, Seoul (KR); Jung-Min Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

This patent is subject to a terminal disclaimer.

(21) Appl. No.: 17/223,740

(22) Filed: Apr. 6, 2021

(65) Prior Publication Data

US 2021/0226327 A1 Jul. 22, 2021

Related U.S. Application Data

(63) Continuation of application No. 16/736,453, filed on Jan. 7, 2020, now Pat. No. 10,971,810, which is a (Continued)

(30) Foreign Application Priority Data

Jan. 21, 2016 (KR) ........................ 10-2016-0007714

(51) Int. Cl.
*H01Q 5/40* (2015.01)
*H01Q 1/22* (2006.01)
(Continued)

(52) U.S. Cl.
CPC ............. *H01Q 5/40* (2015.01); *H01Q 1/2291* (2013.01); *H01Q 1/38* (2013.01); *H01Q 1/48* (2013.01);
(Continued)

(58) Field of Classification Search
CPC ...... H01Q 5/42; H01Q 9/0407; H01Q 21/065; H01Q 21/293; H01Q 21/30; H01Q 5/40; H01Q 21/28
See application file for complete search history.

(56) References Cited

U.S. PATENT DOCUMENTS 6,262,495 B1 7/2001 Yablonovitch et al.
9,368,873 B2 6/2016 Myszne et al.
(Continued)

FOREIGN PATENT DOCUMENTS

CN 101019273 A 8/2007
CN 103441331 A 12/2013
(Continued)

OTHER PUBLICATIONS

Communication pursuant to Article 94(3) EPC dated Apr. 13, 2021 in connection with European Patent Application No. 17 741 674.0, 7 pages.

(Continued)

*Primary Examiner* — Ab Salam Alkassim, Jr.

(57) ABSTRACT

An electronic device may include a circuit board, radiators disposed on the circuit board, and provided with a first feeding signal to transmit or receive a wireless signal in a first frequency band; and a ground disposed on the circuit board to provide a reference potential for the radiators. The radiators and a whole or a portion of the ground may be provided with an additional feeding signal to transmit or receive a wireless signal in various frequency bands that are lower than the first frequency band.

9 Claims, 9 Drawing Sheets

Related U.S. Application Data continuation of application No. 15/411,568, filed on Jan. 20, 2017, now Pat. No. 10,530,066.

(51) Int. Cl.

| | |
|---|---|
| ***H01Q 1/38*** | (2006.01) |
| ***H01Q 1/48*** | (2006.01) |
| ***H01Q 1/52*** | (2006.01) |
| ***H01Q 3/24*** | (2006.01) |
| ***H01Q 5/42*** | (2015.01) |
| ***H01Q 9/04*** | (2006.01) |
| ***H01Q 9/42*** | (2006.01) |
| ***H01Q 21/06*** | (2006.01) |
| ***H01Q 21/28*** | (2006.01) |
| ***H01Q 21/29*** | (2006.01) |
| ***H01Q 21/30*** | (2006.01) |

(52) U.S. Cl.

CPC ............... *H01Q 1/523* (2013.01); *H01Q 3/24* (2013.01); *H01Q 5/42* (2015.01); *H01Q 9/0407* (2013.01); *H01Q 9/42* (2013.01); *H01Q 21/065* (2013.01); *H01Q 21/28* (2013.01); *H01Q 21/293* (2013.01); *H01Q 21/30* (2013.01); *H01Q 21/064* (2013.01)

(56) References Cited

U.S. PATENT DOCUMENTS

| | | | | |
|---|---|---|---|---|
| 9,531,087 | B2 | 12/2016 | Ying | |
| 9,972,919 | B2 | 5/2018 | Hong et al. | |
| 10,270,186 | B2 | 4/2019 | Teshima et al. | |
| 10,530,066 | B2 * | 1/2020 | Lee | H01Q 1/2291 |
| 10,971,810 | B2 * | 4/2021 | Lee | H01Q 21/293 |
| 2005/0225498 | A1 * | 10/2005 | Koparan | H01Q 1/246 343/895 |
| 2007/0035456 | A1 | 2/2007 | Jeong | |
| 2008/0074340 | A1 * | 3/2008 | Song | H01Q 9/285 343/820 |
| 2008/0246674 | A1 * | 10/2008 | Rutfors | H01Q 9/0407 343/722 |
| 2008/0266179 | A1 | 10/2008 | Sotoudeh et al. | |
| 2009/0015499 | A1 | 1/2009 | Kuroda | |
| 2009/0146907 | A1 * | 6/2009 | Brown | H01Q 15/0013 343/912 |
| 2009/0224995 | A1 * | 9/2009 | Puente | H01Q 1/42 343/893 |
| 2009/0231225 | A1 | 9/2009 | Choudhury et al. | |
| 2011/0018780 | A1 * | 1/2011 | Tassoudji | H01Q 1/22 343/844 |
| 2011/0279338 | A1 | 11/2011 | Myszne et al. | |
| 2012/0105287 | A1 | 5/2012 | Jung et al. | |
| 2013/0016013 | A1 | 1/2013 | Wong et al. | |
| 2013/0147664 | A1 | 6/2013 | Lin | |
| 2013/0203364 | A1 * | 8/2013 | Darnell | H01Q 5/35 455/77 |
| 2013/0207869 | A1 | 8/2013 | Han et al. | |
| 2013/0257672 | A1 | 10/2013 | Lu et al. | |
| 2014/0055309 | A1 | 2/2014 | Jenwatanavet | |
| 2014/0066757 | A1 * | 3/2014 | Chayat | H01Q 13/085 343/893 |
| 2014/0097995 | A1 | 4/2014 | McKinzie, III | |
| 2014/0266902 | A1 | 9/2014 | Kamgaing et al. | |
| 2015/0116169 | A1 | 4/2015 | Ying | |
| 2015/0303577 | A1 | 10/2015 | Sonoda et al. | |
| 2015/0318622 | A1 * | 11/2015 | Pruett | H01Q 21/061 343/893 |
| 2016/0043470 | A1 * | 2/2016 | Ko | H01Q 21/28 343/893 |
| 2016/0211586 | A1 | 7/2016 | Hong et al. | |
| 2016/0218416 | A1 | 7/2016 | Van Wonterghem | |
| 2017/0012359 | A1 * | 1/2017 | Jung | H01Q 3/30 |
| 2017/0062953 | A1 * | 3/2017 | Teshima | H01Q 3/24 |
| 2017/0214120 | A1 | 7/2017 | Lee et al. | |
| 2019/0148839 | A1 | 5/2019 | Lin et al. | |
| 2019/0207324 | A1 | 7/2019 | Teshima et al. | |
| 2020/0161763 | A1 * | 5/2020 | Lee | H01Q 25/00 |
| 2022/0158362 | A1 * | 5/2022 | Zimmerman | H01Q 21/26 |

FOREIGN PATENT DOCUMENTS

| | | | |
|---|---|---|---|
| CN | 103945568 | A | 7/2014 |
| EP | 3341998 | A1 | 7/2018 |
| EP | 3401999 | A1 | 11/2018 |
| KR | 10-2010-0020233 | A | 2/2010 |
| WO | 2010074618 | A1 | 7/2010 |
| WO | 2013158465 | A1 | 10/2013 |
| WO | 2015041422 | A1 | 3/2015 |
| WO | 2017/034881 | A1 | 3/2017 |

OTHER PUBLICATIONS

Korean Intellectual Property Office, International Search Report, Application No. PCT/KR20171000672, dated Apr. 20, 2017, 3 pages, KIPO, Daejeon, Korea.

Korean Intellectual Property Office, Written Opinion of the International Searching Authority, Application No. PCT/KR2017/000672, dated Apr. 20, 2017, 10 pages, KIPO, Daejeon, Korea.

Communication from a foreign patent office in a counterpart foreign application, European Patent Office, "Supplementary Partial European Search Report," Application No. EP 17741674.0, dated Oct. 18, 2018, 11 pages.

Supplementary European Search Report dated Jan. 16, 2019 in connection with European Patent Application No. 17 74 1674, 13 pages.

Ralph Pokuls et al., "Dual-Frequency and Dual-Polarization Microstrip Antennas for SAR Applications", IEEE Transactions on Antennas and Propagation, vol. 46, No. 9, Sep. 1998, p. 1289-1296.

China National Intellectual Property Administration, "The First Office Action," Application No. CN 201780007541.9, dated Oct. 25, 2019, 26 pages.

* cited by examiner

ANTENNA DEVICE AND ELECTRONIC DEVICE HAVING THE SAME

CROSS-REFERENCE TO RELATED APPLICATIONS

This application is a continuation of U.S. application Ser. No. 16/736,453, filed Jan. 7, 2020, now U.S. Pat. No. 10,971,810, which is a continuation of U.S. application Ser. No. 15/411,568, filed Jan. 20, 2017, now U.S. patent Ser. No. 10/530,066, which claims priority to Korean Application No. 10-2016-0007714, filed Jan. 21, 2016, the entire contents of which are hereby incorporated by reference.

BACKGROUND

1. Field

Various embodiments of the present disclosure relate to an antenna device. For example, various embodiments of the present disclosure relate to an antenna device that is provided in an electronic device.

2. Description of Related Art

Efforts have been made to develop a 5G (5th-generation) communication system or a pre-5G communication system in order to satisfy a demand for wireless data traffic which is on an increasing trend after the commercialization of the 4G (4th-generation) communication system. Due to this, the 5G communication or the pre-5G communication system is referred to as a "beyond 4G network communication system" or a "post LTE system."

In order to achieve a high data transmission rate, it is considered to implement the 5G communication system in an ultra-high frequency (mmWave) band (e.g., a 60 gigahertz (GHz) band). In order to alleviate the route loss of an electromagnetic wave and to increase the transmission distance of an electromagnetic wave in the ultra-high frequency band, a beam-forming technology, a massive Multi-Input Multi-Output (massive MIMO) technology, a Full Dimensional MIMO (FD-MIMO) technology, an array antenna technology, an analog beam-forming technology, a large scale antenna technology, and so on are being discussed in the 5G communication system.

In addition, in order to improve a system network, an evolved small cell technology, an advanced small cell technology, a cloud Radio Access Network (cloud RAN) technology, an ultra-dense network technology, a Device to Device communication (D2D) technology, a wireless backhaul technology, a moving network technology, a cooperative communication technology, a Coordinated Multi-Points (CoMP), an interference cancellation technology, and so on are being developed in the 5G communication system.

In addition, hybrid FSK and QAM modulation (FQAM) and sliding window superposition coding (SWSC), which are Advanced Coding Modulation (ACM) methods, Filter Bank Multi Carrier (FBMC), Non-Orthogonal Multiple Access (NOMA), and SCMA (sparse code multiple access), which are advanced connection technologies), and so on are being developed in the 5G communication system.

Wireless communication techniques have recently been implemented in various types (e.g., a wireless Local Area Network (w-LAN) represented by the WiFi technique, Bluetooth, and Near Field Communication (NFC)), in addition to a commercialized mobile communication network connection. Mobile communication services were initiated from a voice call service, and have gradually progressed to super-high-speed and large-capacity services (e.g., a high quality video streaming service), and it is expected that the next generation mobile communication service to be subsequently commercialized, including WiGig or the like, will be provided through an ultra-high frequency band of dozens of GHz or more.

As communication standards, such as NFC and Bluetooth, have become active, electronic devices (e.g., a mobile communication terminal) have been equipped with antenna devices that operate in variously different frequency bands, respectively. For example, the fourth generation mobile communication service has been operated in the frequency bands of, for example, 700 MHz, 1.8 GHz, and 2.1 GHz, WiFi have been operated in the frequency bands of 2.4 GHz and 5 GHz although it may differ slightly depending on a rule, and Bluetooth has been operated in the frequency band of 2.45 GHz.

In order to provide a service of stabilized quality in a commercialized wireless communication network, a high gain and a wide radiation area (beam coverage) of an antenna device should be satisfied. The next generation mobile communication service will be provided through an ultra-high frequency band (hereinafter, referred to as a "mmWave band) of a dozen GHz or more (e.g., a frequency band that ranges from 10 GHz to 300 GHz and has a resonance frequency wavelength that ranges from 1 mm to 30 mm).

SUMMARY

An electronic device is equipped with antenna devices that operate in frequency bands (hereinafter, referred to as "commercially available frequency bands") of the existing wireless communication networks (e.g., 4G mobile communication, WiFi, and Bluetooth). When antenna devices are additionally installed to transmit/receive a wireless signal in the mmWave band, there may be difficulties in additionally securing a space for disposing such antenna devices within the electronic device.

To address the above-discussed deficiencies, it is a primary object to provide an antenna device that is capable of securing a radiating performance that is stable in the mmWave band even though the antenna device is installed together with the antenna devices that operate in commercially available frequency bands.

In addition, various embodiments of the present disclosure are to provide an antenna device that enables an antenna of the mmWave band to be mounted while maintaining the design of an existing miniaturized and slimmed electronic device, thereby contributing to the commercialization of the antenna device.

According to various embodiments of the present disclosure, an electronic device may include: a circuit board; radiators disposed on the circuit board, and provided with a first feeding signal to transmit/receive a wireless signal in a first frequency band; and a ground disposed on the circuit board to provide a reference potential for the radiators. The radiators and the whole or a portion of the ground are provided with an additional feeding signal to transmit/receive a wireless signal various frequency bands that are lower than the first frequency band.

According to various embodiments of the present disclosure, an electronic device may include: a housing; a main circuit board provided in the housing; and an antenna device provided in the housing. The antenna device may include: a circuit board; radiators disposed on the circuit board, and provided with a first feeding signal to transmit/receive a wireless signal in a first frequency band; and a ground disposed on the circuit board to provide a reference potential for the radiators. The radiators and the ground may be provided with an additional feeding signal to transmit/receive a wireless signal in various frequency bands that are lower than the first frequency band.

According to various embodiments of the present disclosure, while transmitting/receiving a wireless signal in a first frequency band (e.g., a mmWave band) by using the radiators that are provided with a first feeding signal and a ground that provides a reference potential for the radiators, the antenna device may provide a second feeding signal to the radiators or the ground to transmit/receive a wireless signal in a second band (e.g., a commercially available frequency band). In addition, according to various embodiments of the present disclosure, it is possible to implement an antenna device that may provide a communication function in a second frequency band by using a portion of an antenna device that provides a communication function in a first frequency band, thereby reducing a space in which antennas are mounted within an electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
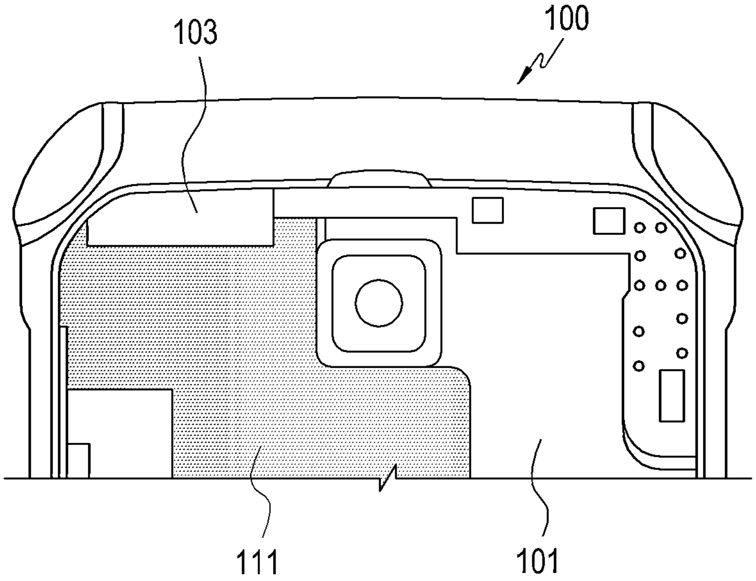
FIG. 1 is a view illustrating a main portion of an electronic device according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication devices.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. As used herein, singular forms may include plural forms as well unless the context clearly indicates otherwise. In the present disclosure, the expression "A or B", "at least one of A or/and B", or "one or more of A or/and B" may include all possible combinations of the items listed. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "directly coupled" to another element (second element), the element may be connected directly to the other element or connected to the other element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google Tv™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to various embodiments of the present disclosure is not limited to the above described devices. The term "user" as used in various embodiments of the present disclosure may refer to a person who uses an electronic device or a device (for example, an artificial intelligence electronic device) that uses an electronic device.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude embodiments of the present disclosure.

FIG. 1 is a view illustrating a main portion of an electronic device according to various embodiments of the present disclosure.

Referring to FIG. 1, the electronic device 100 according to various embodiments of the present disclosure can include an antenna device 103 disposed within a housing 101. Although not illustrated, the electronic device 100 can include various input/output devices installed on one face of the housing 101 (e.g., a display device, a touch pad, and a sound module), and can control the input/output devices or can store information or the like input or output through the input/output devices by including a processor or a memory.

The housing 101 can provide a space for accommodating a structure on which various input/output devices or the like can be disposed and/or circuit devices, such as the processor, and can be at least partially made of an electrically conductive material.

The electronic device 103 can further include one or more radiating conductors. The circuit board on which the antenna device 103 is disposed can be a main circuit board 111 accommodated in the housing 101, or another circuit board that is disposed separately from the main circuit board 111. The antenna device can include a combination of a via hole implemented within a circuit board, an electric conductor filled in the via hole, a conductor pattern implemented on the circuit board, and so on. The antenna device 103 can communicate a wireless signal by being fed with a power from a communication module (and/or a communication circuit chip). Here, the "communication" can mean at least one of transmission, reception, and transmission/reception of a wireless signal. According to various embodiments, the antenna device 103 can configure an antenna that transmits/receives a wireless signal in a frequency band of dozens of GHz or more (e.g., a mmWave communication antenna). The antenna device 103 can include a communication chip circuit mounted on the circuit board.

The antenna device 103 can include an antenna device disclosed in Korean Laid-Open Patent Publication No. 10-2015-0032972 filed in the name of the applicant of the present application and published on Apr. 1, 2015 (International Patent Publication No. WO2015/041422 published on Mar. 26, 2015). According to various embodiments, the antenna device 103 can be implemented in various forms (e.g., a Yagi-Uda antenna structure, a grid-type antenna structure, a patch type antenna structure, an inverted-F antenna structure, a monopole antenna structure, a slot antenna structure, a loop antenna structure, a horn antenna structure, and a dipole antenna structure) according to a combination of a via hole formed in a circuit board, an electric conductor filled in the via hole, a printed circuit pattern formed on the circuit board, and so on.

Figure 2:
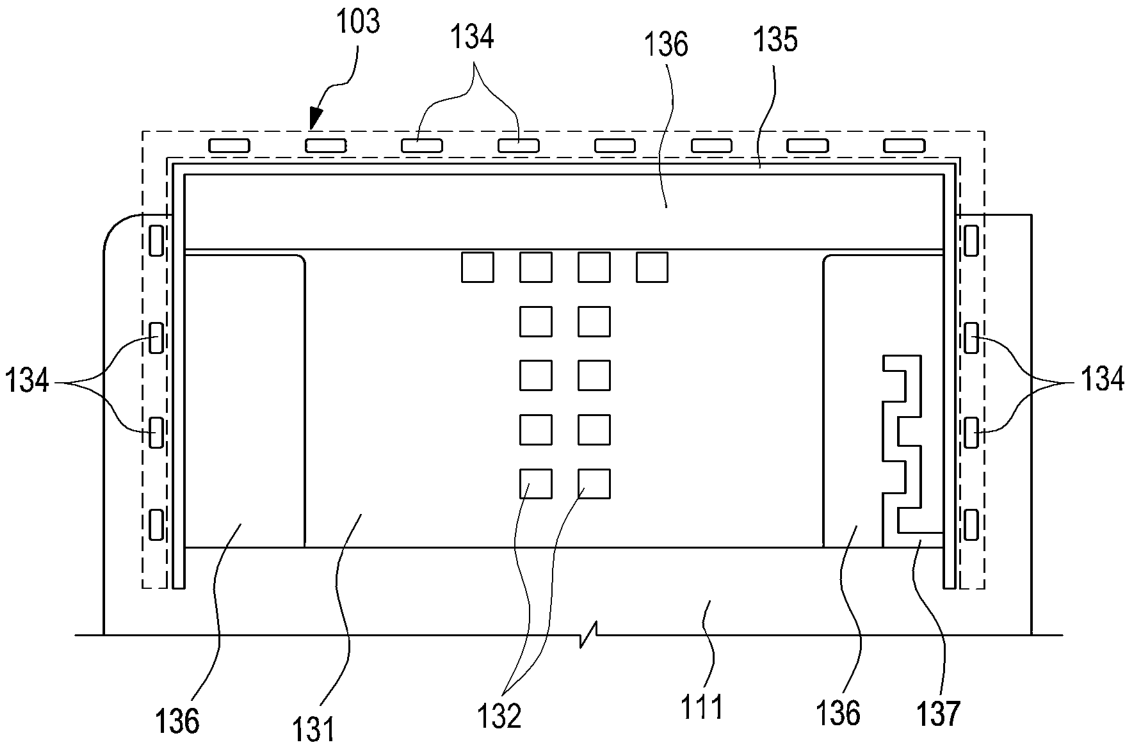
FIG. 2 is a plan view illustrating an antenna device according to one of various embodiments of the present disclosure.
Figure 3:
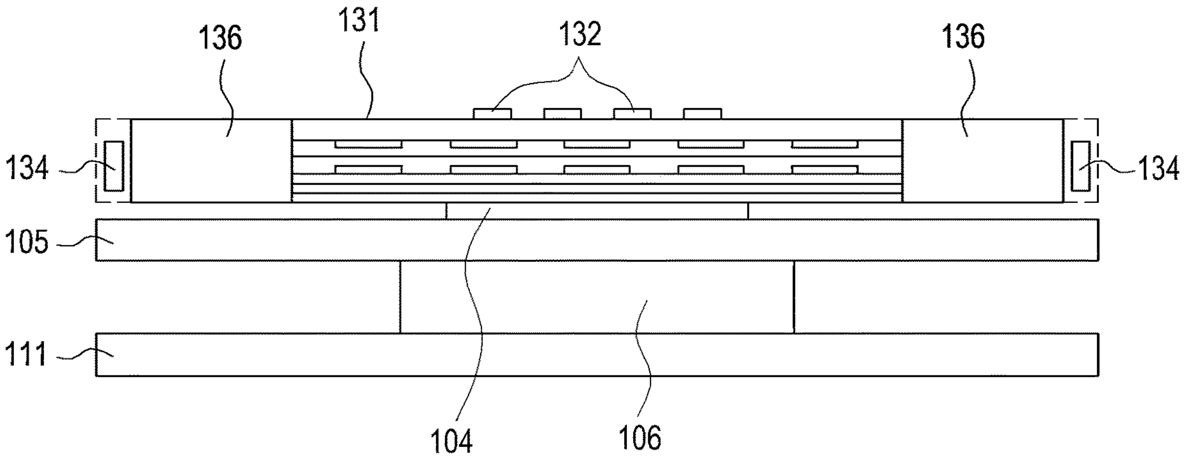
FIG. 3 is a sectional view illustrating an antenna device according to one of various embodiments of the present disclosure.

FIG. 2 is a plan view illustrating an antenna device according to one of various embodiments of the present disclosure. FIG. 3 is a sectional view illustrating an antenna device according to one of various embodiments of the present disclosure.

Referring to FIGS. 2 and 3, according to one of various embodiments of the present disclosure, an antenna device 103 can include radiators 132 and 134 that transmits/receives a wireless signal in a first frequency band (e.g., a mmWave band) and a ground 135 that provides a reference potential for the radiators 132 and 134, and the radiators 132 and the ground 135 can be disposed on the circuit board 131.

The circuit board 131 can be disposed on the main circuit board 111 of the electronic device 100 (FIG. 1) to receive an electronic signal transmitted from the main circuit board 111. The circuit board 131 can have a plurality of layers stacked therein, and can be formed of a flexible printed circuit board, a dielectric board, or the like. Each of the layers can include a printed circuit pattern is formed of an electric conductor and via holes that are formed to penetrate the front and rear faces (or top and bottom faces). In general, via holes, which are formed in a multi-layered circuit board, can be formed in order to electrically interconnect printed circuit patterns, which are formed in different layers, or in order to dissipate heat.

Some 132 of the radiators can be disposed on one face of the circuit board 131 (e.g., the top face of the circuit board 131), and can be aligned on the top face of the circuit board 131 in the longitudinal direction, or in a direction perpendicular to the longitudinal direction. In addition, the ground 135 can be disposed on the side face of the circuit board 131, and the other radiators 134 can be disposed at a side of the ground 135 to be spaced apart from each other by a predetermined interval. Some 132 of the radiators can be electrically connected to the ground 135 via a wiring that is formed as a conductive material is filled in the via hole within the circuit board 131. The radiators 132 and 134 can transmit/receive a wireless signal in a first frequency band by receiving a reference potential of the ground 135 while being provided with a first feeding signal. However, without being limited to being disposed along the side face of the circuit board 131, the ground 135 can be disposed in at least one layer of the circuit board 131 to provide a reference potential for the radiators 132 and 134.

In addition, according to one of various embodiments of the present disclosure, the antenna device 103 can include a communication circuit module 104, a sub-circuit board 105, and a heat dissipation member 106 which are sequentially disposed between the circuit board 131 and the main circuit board 111.

The communication circuit module 104 can provide the first feeding signal to the radiators 132 and 134 by being disposed between the circuit board 131 and the sub-circuit board 105. Although not illustrated, the sub-circuit board 105 can be electrically connected to the main circuit board 111 to transmit an electric signal to the communication circuit module 104.

The heat dissipation member 106 can be disposed opposite to the communication circuit module 104 with the sub-circuit board 105 being interposed therebetween. The heat dissipation member 106 can dissipate the heat generated from the communication circuit module 104.

In addition, according to various embodiments of the present disclosure, the ground 135 can be additionally provided with a feeding signal from a second communication circuit module disposed on the communication circuit module 104 and/or the main circuit board 111 to transmit/receive a wireless signal in the second frequency band. Here, the second frequency band can correspond to various frequency bands that are lower than the first frequency band. In addition, the additional feeding signal can be a second feeding signal that is different from the first feeding signal.

In addition, according to various embodiments of the present disclosure, the first radiators 134 have a first length, the ground 135 can be utilized as the second radiator having a length that is longer than the first length, and the first radiators 134 can be arranged along the ground 135 (e.g., the second radiator). In addition, the first radiators can be arranged to be spaced apart from the ground 135 (e.g., the second radiator).

In addition, some of the radiators 132 and 134 can form a capacitive coupling with the ground 135 when the second feeding signal is provided to the ground 135 such that some of the radiators 132 and 134, which have formed the capacitive coupling with the ground 135, or can be utilized as some of the capacitive elements that generate a wireless signal in the second frequency band. That is, the ground 135 and some of the radiators 132 and 134, which have formed the capacitive coupling with the ground 135, can transmit/receive a wireless signal in the second frequency band when the second feeding signal is provided.

In addition, according to various embodiments of the present disclosure, some of the radiators 132 and 134 are electrically connected with the ground 135 to be utilized as inductive elements that resonate a wireless signal in the second frequency band. That is, some of the radiators 132 and 134 can transmit/receive, together with the ground 135, a wireless signal in the second frequency band when the second feeding signal is provided.

In addition, according to various embodiments of the present disclosure, the antenna device 103 can include an additional radiator 137 extending from the ground 135. The additional radiator 137 can include a circuit board pattern formed on the circuit board 131, and can adjust the second frequency band formed through the ground 135. For example, the additional radiator 137 can be connected to the ground 135 to adjust the electric length of the radiator that forms a resonance frequency of the second frequency band. In addition, the circuit board 131 can include fill-cut regions 136 formed along the circumference of the circuit board 131. The fill-cut region 136 refers to a region in which no electrically conductive material is disposed, and can prevent the radiators 132 and 134 and each of the other circuit devices from affecting the radiating performance. In addition, the additional radiator 137 can be disposed in the fill-cut region 136 to reduce the influence on the operations of the radiators 132 and 134.

Figure 4:
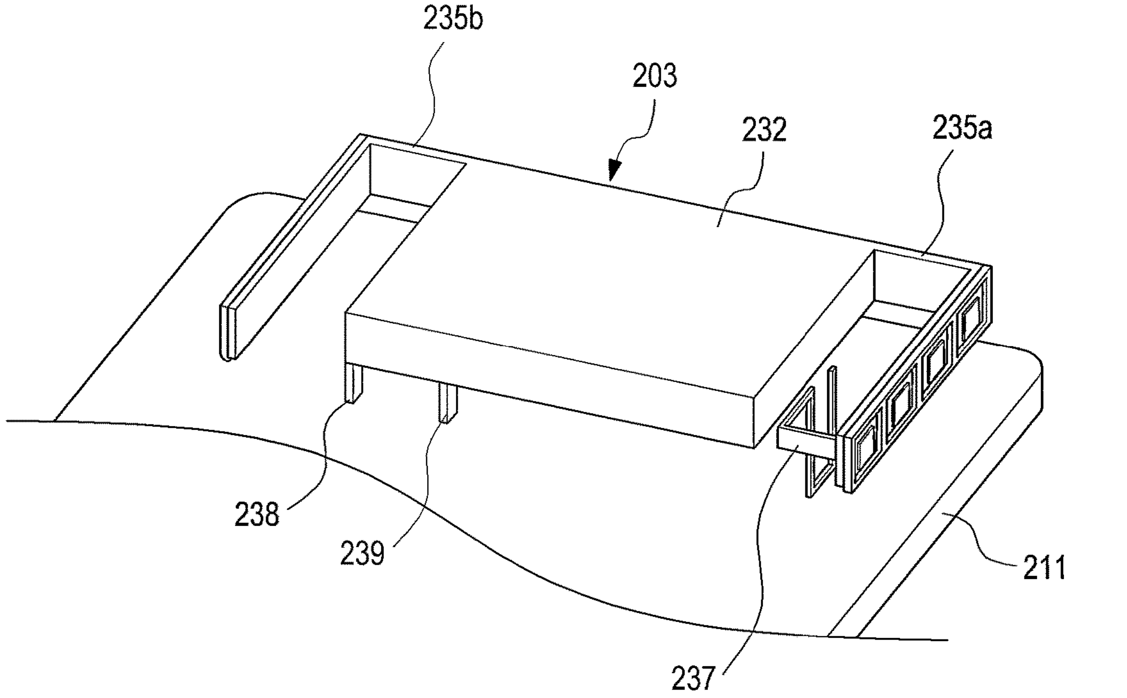
FIG. 4 is a perspective view illustrating an antenna device according to another one of various embodiments of the present disclosure.
Figure 5:
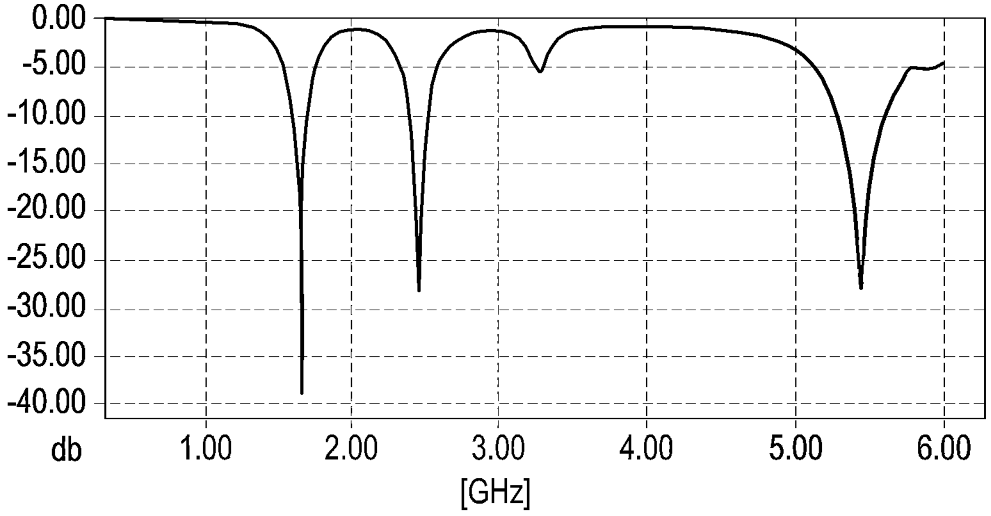
FIG. 5 is a graph for describing a radiating characteristic of the antenna device illustrated in FIG. 4.

FIG. 4 is a perspective view illustrating an antenna device according to another one of various embodiments of the present disclosure. FIG. 5 is a graph for describing a radiating characteristic of the antenna device illustrated in FIG. 4. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIGS. 4 and 5, according to one of various embodiments of the present disclosure, antenna device 203 can include a circuit board 232, grounds 235*a* and 235*b*, an additional radiator 237, a feeder line 238, and a ground line 239, which are disposed on a main circuit board 211.

Each of the feeder line 238 and the ground line 239 electrically interconnects the main circuit board 211 and the circuit board 232, and the circuit board 232 can be provided with a second feeding signal through the feeder line 238.

In addition, the second feeding signal can enable a wireless signal to be transmitted/received in one band (e.g., about 1.8 GHz to 1.9 GHz) within the second frequency band through a route (or conductor) formed by a combination of one of the ground 235*a* and the additional radiator 237. In addition, the second feeding signal can enable a wireless signal to be transmitted/received in another band (e.g., about 2.4 GHz to 2.6 GHz) within the second frequency band through the other ground 235*b*. In addition, the second feeding signal can enable a wireless signal to be transmitted/received in still another band (e.g., about 5 GHz to 6 GHz) within the second frequency band via the circuit board 232 between the feeder line 238 and the ground line 239.

Figure 6:
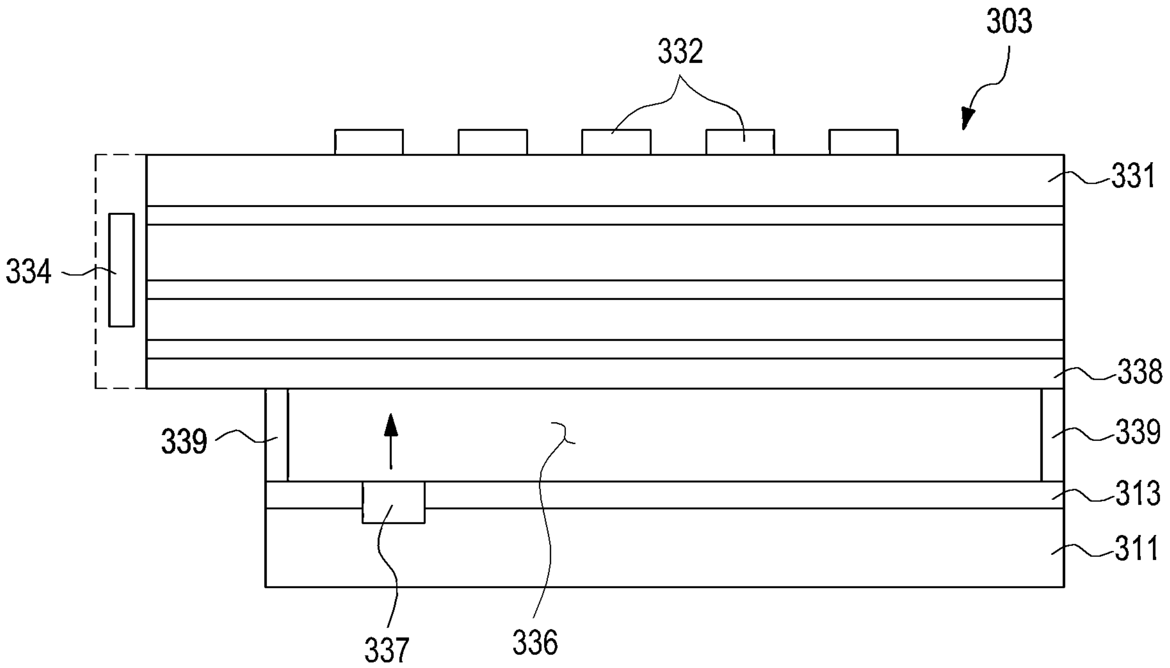
FIG. 6 is a sectional view illustrating an antenna device according to still another one of various embodiments of the present disclosure.

FIG. 6 is a sectional view illustrating an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 6, according to still another one of various embodiments of the present disclosure, an antenna device 303 can include a circuit board 331, radiators 332 and 334, and a ground 338.

The ground 338 can be provided on one face of the circuit board 331 (e.g., the bottom face of the circuit board 331) to provide a reference potential for one radiator 332.

The antenna device 303 including the above-mentioned components can be provided in the above-described electronic device 100 (see FIG. 1), and the circuit board 331 can be disposed on the main circuit board 311 (e.g., the main circuit board 111 illustrated in FIG. 1).

According to various embodiments of the present disclosure, the electronic device can further include a second ground 313 provided on the main circuit board 311, a connection part 339 that interconnects the ground 338 and the second ground 313, and a feeding unit 337 provided on the main circuit board 311.

The second ground 313 can be provided on the main circuit board 311 to face the ground 338, and a slot 336 can be formed through a combination of the ground 338, the second ground 313, and/or the connection part 339. For example, the connection part 339 can electrically and/or physically connect one end of the ground 338 and one end of the second ground 313 to each other so as to implement a slot antenna that is constituted with the ground 338, the second ground 313, and the connection part 339, and is opened in one side and/or one end.

The feeding unit 337 provides a power across the slot 336 so as to generate an electric flow of a feeding signal around the slot 336 such that the slot antenna can transmit/receive a wireless signal in the second frequency band.

Figure 7:
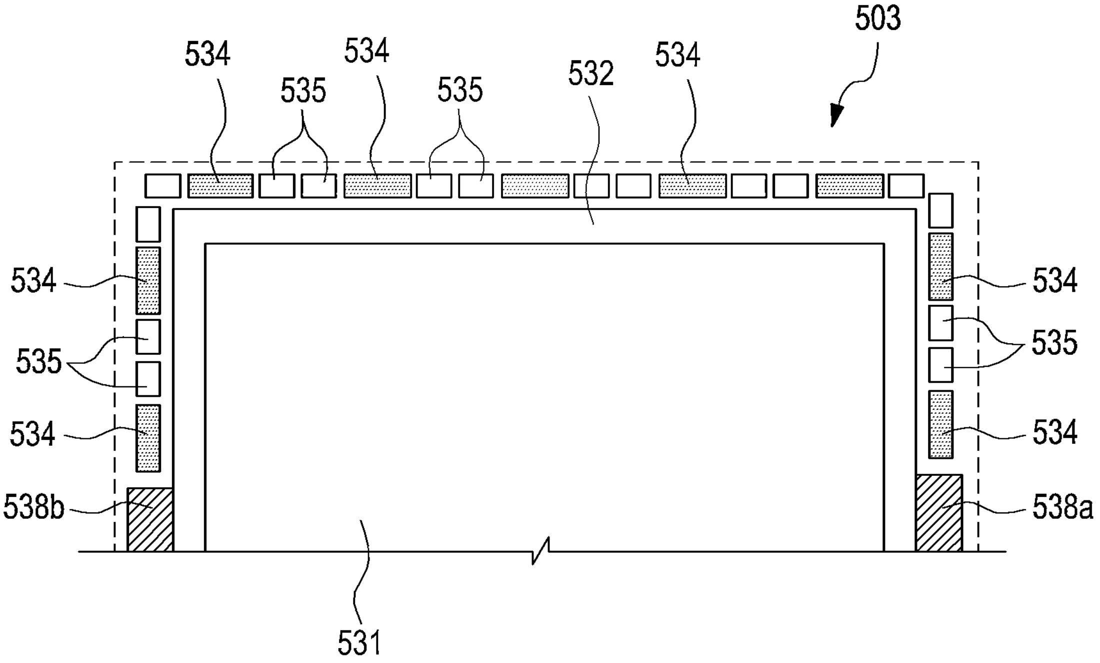
FIG. 7 is a plan view illustrating an antenna device according to still another one of various embodiments of the present disclosure.
Figure 8:
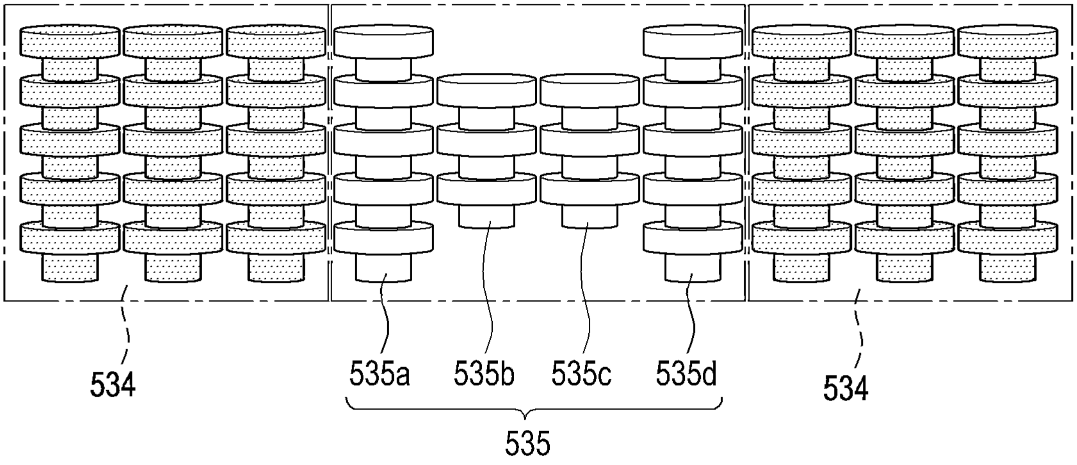
FIG. 8 is a view illustrating a radiator and electric conductors of an antenna device according to still another one of various embodiments of the present disclosure.

FIG. 7 is a plan view illustrating an antenna device according to still another one of various embodiments of the present disclosure. FIG. 8 is a view illustrating a radiator and electric conductors of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIGS. 7 to 8, according to still another one of various embodiments of the present disclosure, an antenna device 503 can include a circuit board 531, feeding units 538*a* and 538*b*, a ground 532, radiators 534, and electric conductors 535. In addition, the antenna device 503 can include gaps formed between the radiators 534, and the electric conductors 535 can be provided in the gaps, respectively.

In a case where the radiators 534 are arranged on the circuit board 531, a radiating efficiency can be deteriorated due to the electric interference between the radiators 534. Accordingly, in the antenna device 503, which is constituted by arranging the radiators 534 on one circuit board 531, it is necessary to electrically isolate the radiators 534 from each other.

Accordingly, in the antenna device 503 according to still another one of various embodiments of the present disclosure, the electric conductors 535 can be provided in the gaps between the plurality of radiators 534 so as to block the electric interference between the radiators 534. The electric conductor 535 can include an Artificial Magnetic Conductor (AMC) element.

When a current flows on one face of a metal, an image current flowing in the opposite direction is formed on the other face of the metal. Such an electric characteristic can deteriorate the radiating efficiency of the radiator 534 of the antenna device. The electric conductor (e.g., the AMC element) can improve the radiating efficiency by blocking the electromagnetic interference between the radiators by forming, on one face of the electric conductor, an image current that flows in the same direction as the current that flows in the other face of the electric conductor. The electric conductors 535 constituted with the AMC elements can be implemented using via holes formed in the circuit board 531. For example, the electric conductors 535 can be implemented by using second via holes that are arranged in a direction perpendicular to the first via holes that form the radiator 534, in the layers forming the circuit board 531. In addition, according to various embodiments of the present disclosure, the electric conductors 535 can be provided with the second feeding signal to transmit/receive a wireless signal in the second frequency band. The electric conductors 535 can be electrically connected to each other through the circuit board 531 to be provided with the second feeding signal.

The feeding units 538*a* and 538*b* can be provided on the side face of the circuit board 531 to provide the second feeding signal to the ground 532. Without being limited to being provided on the side face of the circuit board 531, the feeding units 538*a* and 538*b* can be provided on the circuit board 531 to be electrically connected to the ground 532.

The electric conductor 535 can be connected to the ground 532, and when the second feeding signal is provided, can form an inductive coupling with the ground to be utilized as an inductive element. In addition, according to various embodiments of the present disclosure, as the electric conductor 535 forms a capacitive coupling with the ground 532, the electric conductor 535, which forms the capacitive coupling with the ground 532, can be utilized as a part of the capacitive element. For example, one 535*a* of the electric conductors is an inductive element, another one 535*b* and still another one 535*c* of the electric conductors can be a part of a capacitive element, and yet another one 535*d* of the electric conductors can be an inductive element. In order to set the second frequency band that requires the antenna device 503, the electric conductor 535 can be properly selected as an inductive element or a part of a capacitive element.

Figure 9:
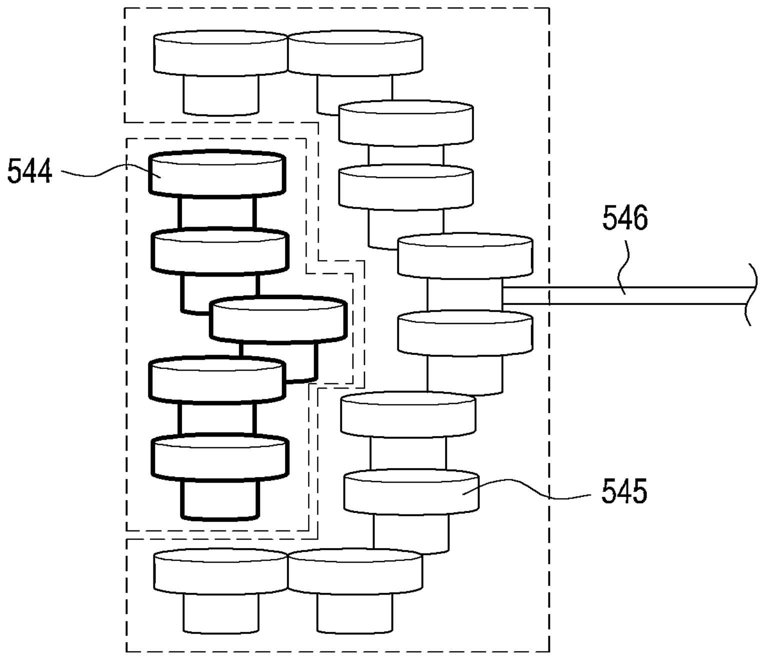
FIG. 9 is a view illustrating a radiator and a feeding structure of an antenna device according to still another one of various embodiments of the present disclosure.

FIG. 9 is a view illustrating a radiator and a feeding structure of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 9, according to still another one of various embodiments of the present disclosure, an antenna device can include radiators 544 and electric conductors 545.

The radiators 544 can be formed to be arranged in any one direction as a conductive material is filled in via holes that are respectively provided in various layers of the circuit board.

The electric conductors 545 are disposed to correspond to the radiators 544 such that the radiators 544 form a capacitive coupling with the electric conductors 545, and when the second feeding signal is provided through the feeding line 546, the radiators 544, which form the capacitive coupling with the conductors 545, can transmit/receive a wireless signal in the second frequency band.

Figure 10:
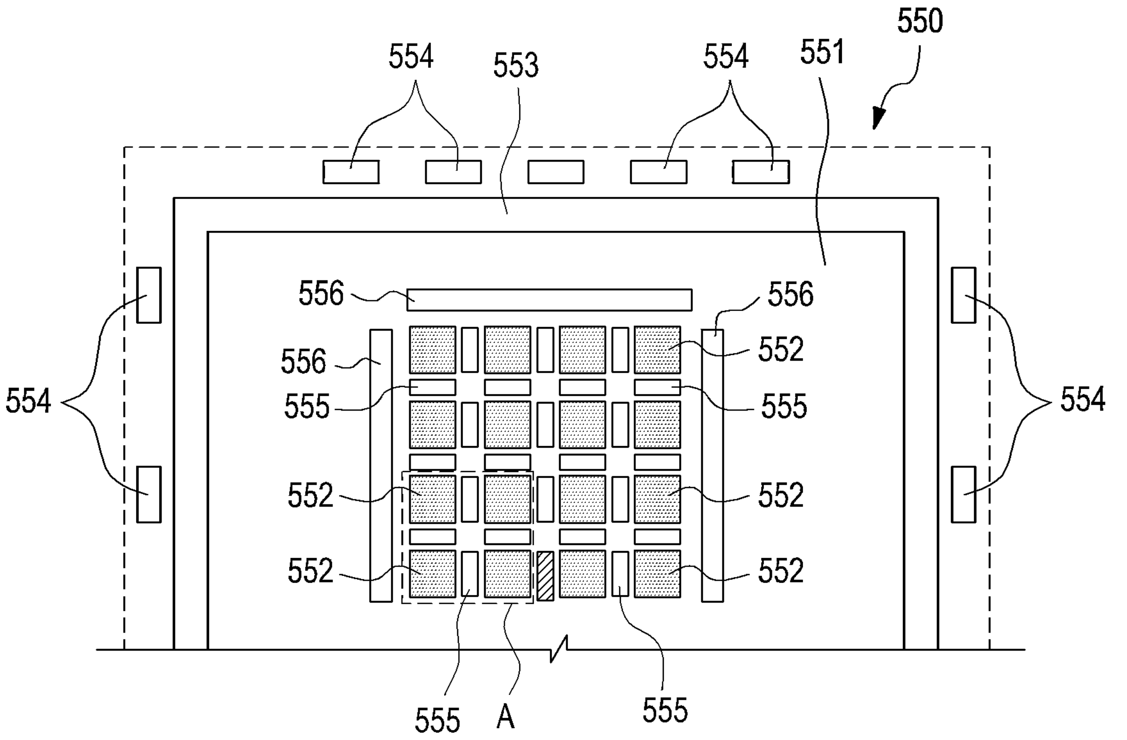
FIG. 10 is a plan view illustrating an antenna device according to still another one of various embodiments of the present disclosure.

FIG. 10 is a plan view illustrating an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 10, according to still another one of various embodiments of the present disclosure, an antenna device 550 can include a circuit board 551, a ground 553, radiators 552 and 554, and electric conductors 555 and 556.

The radiators 552 can be disposed on the top face of the circuit board 551, and on the top face of the circuit board 551, gaps can be formed between the radiators 552.

In addition, as the electric conductors 555 are provided in the gaps, respectively, the electric conductors 555 can be electrically connected to each other through the circuit board 551. The electric conductors 555 can be provided with the second feeding signal to transmit/receive a wireless signal in the second frequency band. In addition, according to various embodiments of the present disclosure, the electric conductors 555 can be utilized as an inductive element or a part of a capacitive element that enables a wireless signal to be transmitted/received in the second frequency band.

Figure 11:
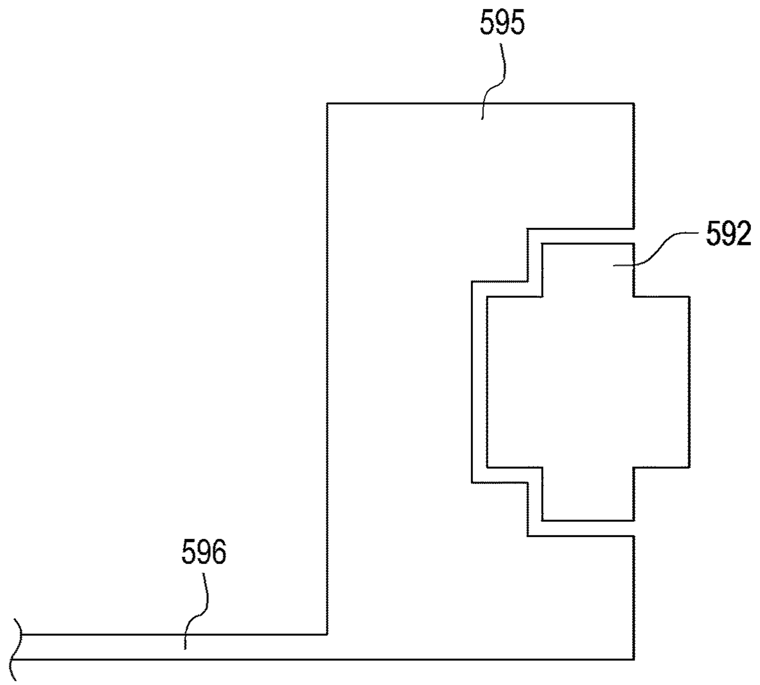
FIG. 11 is a plan view illustrating a radiator and a feeding structure of an antenna device according to still another one of various embodiments of the present disclosure.

FIG. 11 is a plan view illustrating a radiator and a feeding structure of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 11, according to still another one of various embodiments of the present disclosure, an antenna device can include a radiator 592 and an electric conductor 595.

The radiator 592 is provided on a circuit board (e.g., the circuit board 551 illustrated in FIG. 10), and can have a cross (+) shape. In addition, the electric conductor 595 can be provided on the circuit board while having a shape corresponding to the cross shape of the radiator 592.

The electric conductor 595 is disposed to correspond to the radiator 592 such that the radiator 592 forms a capacitive coupling with the electric conductor 595, and when the second feeding signal is provided through the feeding line 596, the radiator 592, which forms the capacitive coupling with the electric conductor 595, can transmit/receive a wireless signal in the second frequency band together with the electric conductor 595.

Figure 12:
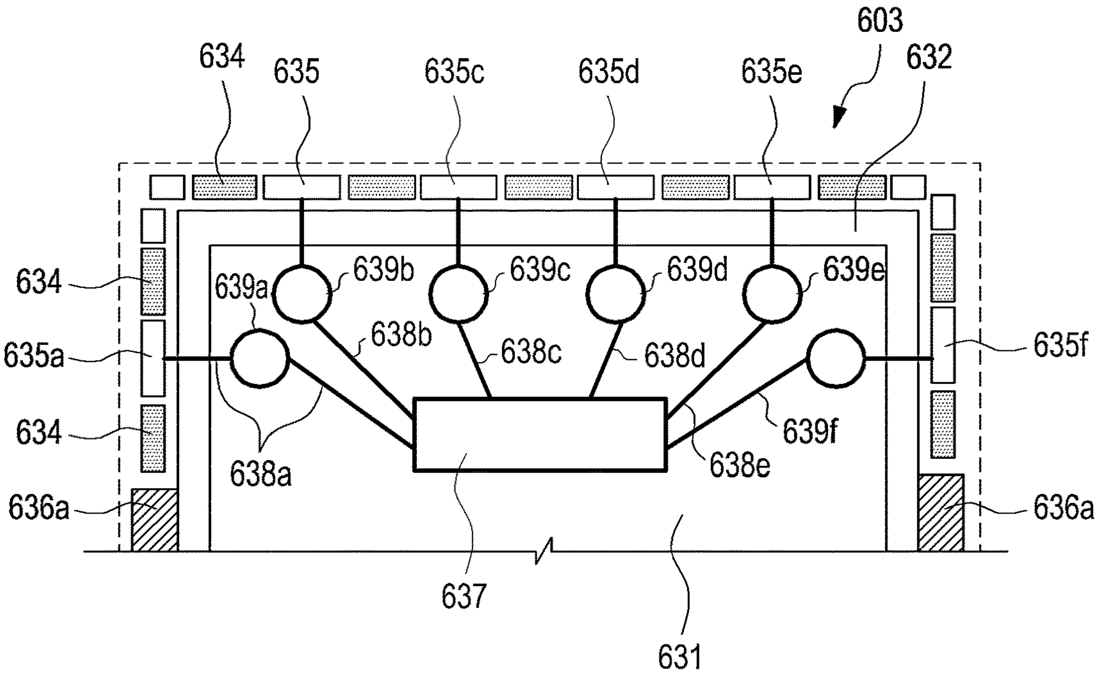
FIG. 12 is a plan view illustrating an antenna device according to still another one of various embodiments of the present disclosure.

FIG. 12 is a plan view illustrating an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 12, according to still another one of various embodiments of the present disclosure, an antenna device 603 can include a circuit board 631, a ground 632, radiators 634, electric conductors 635*a*, 635*b*, 635*c*, 635*d*, 635*e*, and 635*f*, a controller 637, and first switches 639*a*, 639*b*, 639*c*, 639*d*, 639*e*, and 639*f*, and the controller 637 controls the first switches 639*a*, 639*b*, 639*c*, 639*d*, 639*e*, and 639*f* so as to adjust feeding to each of the electric conductors 635*a*, 635*b*, 635*c*, 635*d*, 635*e*, and 635*f*.

The controller 637 can be electrically connected to each of the electric conductors 635*a*, 635*b*, 635*c*, 635*d*, 635*e*, and 635*f* through the conducting lines 638*a*, 638*b*, 638*c*, 638*d*, 638*e*, and 638*f* In addition, the conducting lines 638*a*, 638*b*, 638*c*, 638*d*, 638*e*, and 638*f* can be provided with the first switches 639*a*, 639*b*, 639*c*, 639*d*, 639*e*, and 639*f*, respectively. The controller 637 can adjust the second signal supplied to each of the electric conductors 635*a*, 635*b*, 635*c*, 635*d*, 635*e*, and 635*f* by controlling ON/OFF of the first switches 639*a*, 639*b*, 639*c*, 639*d*, 639*e*, and 639*f*.

In addition, the controller 637 can adjust the second frequency band formed in the ground 632 and the electric conductors 635*a*, 635*b*, 635*c*, 635*d*, 635*e*, and 635*f* by controlling the supply of the second feeding signal to each of the electric conductors 635*a*, 635*b*, 635*c*, 635*d*, 635*e*, and 635*f*.

Figure 13:
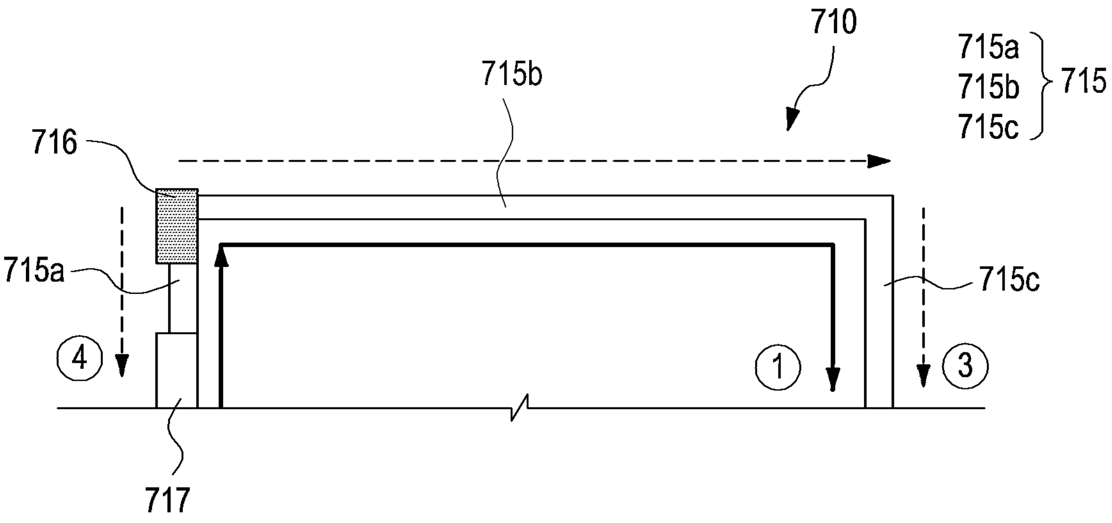
FIG. 13 is a view illustrating a signal flow according to a feeding position of an antenna device according to still another one of various embodiments of the present disclosure.

FIG. 13 is a view illustrating a signal flow according to a feeding position of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 13, according to various embodiments of the present disclosure, an antenna device 710 can include a ground 715, a first feeding unit 717, and a second feeding unit 716.

The ground 715 can include a first part 715*a*, a second part 715*b* extending from the first part 715*a*, and a third part 715*c* extending from the second part 715*b*.

The first feeding unit 717 is provided at one end of the first part 715*a* of the ground 715, and when a second feeding signal is provided to the ground 715, the second feeding signal moves in the ground 715 along the first direction ① such that the ground 715 can transmit/receive a wireless signal in one band (e.g., 1.7 GHz to 1.9 GHz) within the second frequency band.

In addition, the second feeding unit 716 is provided between the first part 715*a* and the second part 715*b*, and when a second feeding signal is provided to the ground 715, the second feeding signal moves in the ground 715 along the third direction ③ such that the ground 715 can transmit/receive a wireless signal in another band (e.g., 2.4 GHz to 2.5 GHz) within the second frequency band. In addition, when the second feeding unit 716 provides a second feeding signal to the ground 715, the second feeding signal moves in the ground 715 along the fourth direction ④ such that the ground 715 can transmit/receive a wireless signal in still another band (e.g., 5 GHz to 6 GHz) within the second frequency band.

Figure 14:
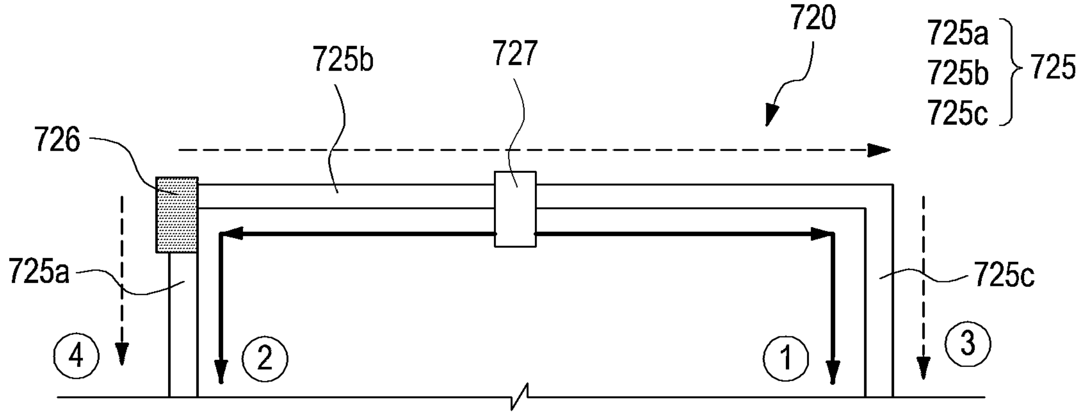
FIG. 14 is a view illustrating a signal flow according to a feeding position of an antenna device according to still another one of various embodiments of the present disclosure.

FIG. 14 is a view illustrating a signal flow according to a feeding position of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 14, according to various embodiments of the present disclosure, an antenna device 720 can include a ground 725, a second feeding unit 726, and a third feeding unit 727.

The second feeding unit 726 is provided between the first part 725*a* and the second part 725*b*, and when a second feeding signal is provided to the ground 725, the second feeding signal moves in the ground 725 along the third direction ③ such that the ground 725 can transmit/receive a wireless signal in another band (e.g., 2.4 GHz to 2.5 GHz) within the second frequency band. In addition, when the second feeding unit 726 provides a second feeding signal to the ground 725, the second feeding signal moves in the ground 725 along the fourth direction ④ such that the ground 725 can transmit/receive a wireless signal in still another band (e.g., 5 GHz to 6 GHz) within the second frequency band.

The third feeding unit 727 is provided in the second part 725*b*, and when a second feeding signal is provided to the ground 725, the second feeding signal moves in the ground 725 along the first direction ① such that the ground 725 can transmit/receive a wireless signal in another band (e.g., 2.4 GHz to 2.7 GHz) within the second frequency band. In addition, when the third feeding unit 727 provides a second feeding signal to the ground 725, the second feeding signal moves in the ground 725 along the second direction ② such that the ground 725 can transmit/receive a wireless signal in still another band (e.g., 2.4 GHz to 2.7 GHz) within the second frequency band.

Figure 15:
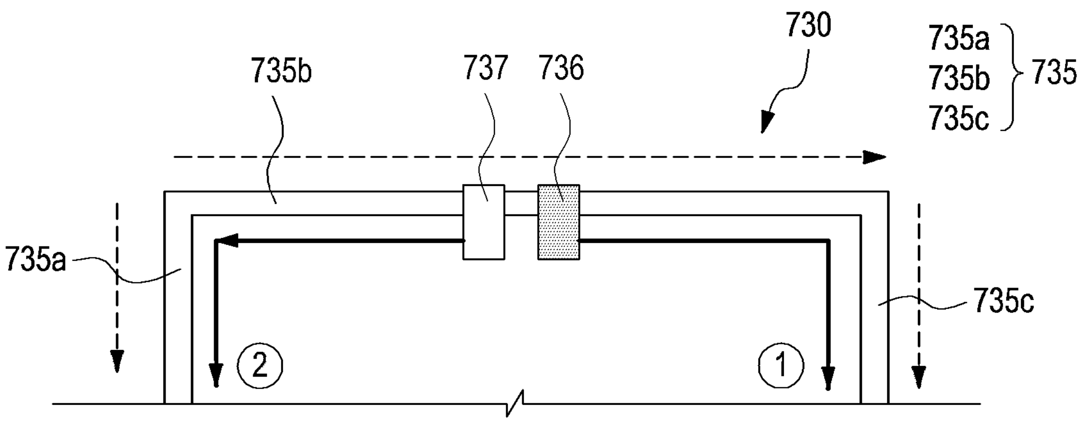
FIG. 15 is a view illustrating a signal flow according to a feeding position of an antenna device according to still another one of various embodiments of the present disclosure.

FIG. 15 is a view illustrating a signal flow according to a feeding position of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 15, according to various embodiments of the present disclosure, an antenna device 730 can include a ground 735, a third feeding unit 736, and a fourth feeding unit 737.

The ground 735 can include a first part 735*a*, a second part 735*b* extending from the first part 735*a*, and a third part 735*c* extending from the second part 735*b*.

The third feeding unit 736 is provided in the second part 735*b*, and when a second feeding signal is provided to the ground 735, the second feeding signal moves in the ground 735 along the first direction ① such that the ground 735 can transmit/receive a wireless signal in another band (e.g., 2.4 GHz to 2.6 GHz) within the second frequency band.

The fourth feeding unit 737 is provided in the second part 735*b*, and when a second feeding signal is provided to the ground 735, the second feeding signal moves in the ground 735 along the second direction ② such that the ground 735 can transmit/receive a wireless signal in another band (e.g., 2.4 GHz to 2.6 GHz) within the second frequency band.

Figure 16:
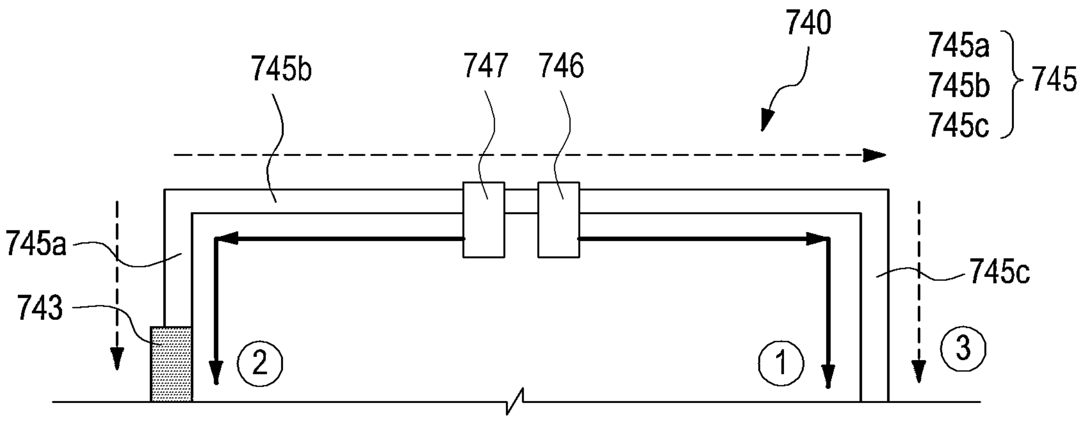
FIG. 16 is a view illustrating a signal flow according to a feeding position of an antenna device according to still another one of various embodiments of the present disclosure.

FIG. 16 is a view illustrating a signal flow according to a feeding position of an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 16, according to various embodiments of the present disclosure, an antenna device 740 can include a ground 745, a first feeding unit 743, a third feeding unit 746, and a fourth feeding unit 747.

The ground 745 can include a first part 745*a*, a second part 745*b* extending from the first part 745*a*, and a third part 745*c* extending from the second part 745*b*.

The first feeding unit 743 is provided at one end of the first part 745*a* of the ground 745, and when a second feeding signal is provided to the ground 745, the second feeding signal moves in the ground 745 along the third direction ③ such that the ground 745 can transmit/receive a wireless signal in one band (e.g., 1.7 GHz to 1.9 GHz) within the second frequency band.

The third feeding unit 746 is provided in the second part 745*b*, and when a second feeding signal is provided to the ground 745, the second feeding signal moves in the ground 745 along the first direction ① such that the ground 745 can transmit/receive a wireless signal in another band (e.g., 2.4 GHz to 2.6 GHz) within the second frequency band.

The fourth feeding unit 747 is provided in the second part 745*b*, and when a second feeding signal is provided to the ground 745, the second feeding signal moves in the ground 745 along the second direction ② such that the ground 745 can transmit/receive a wireless signal in another band (e.g., 2.4 GHz to 2.6 GHz) within the second frequency band.

Figure 17:
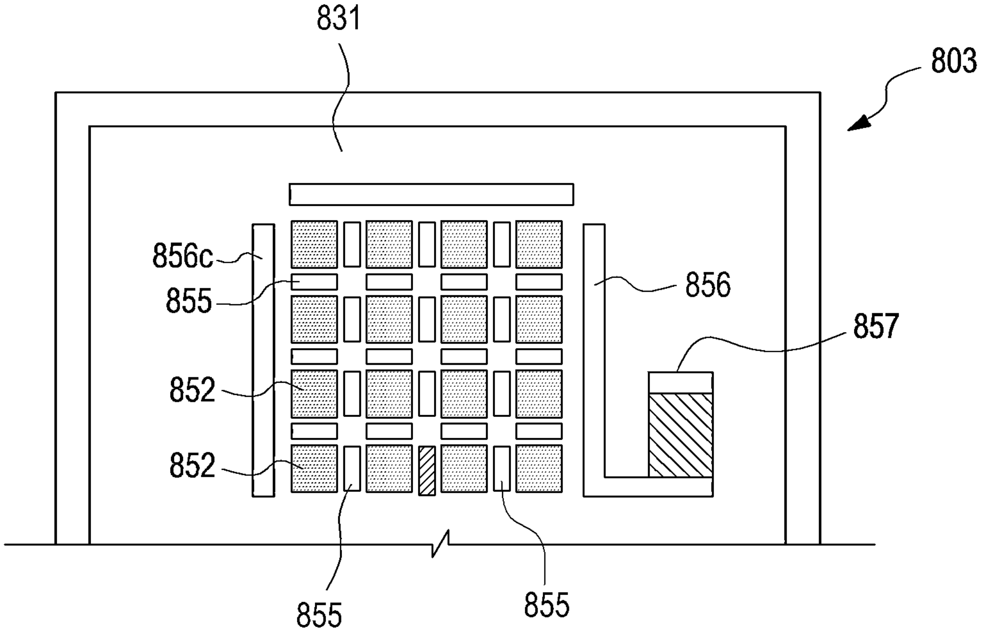
FIG. 17 is a plan view illustrating an antenna device according to yet another one of various embodiments of the present disclosure.

FIG. 17 is a plan view illustrating an antenna device according to still another one of various embodiments of the present disclosure. In describing various embodiments of the present disclosure below, the components that can be easily understood through the configuration of the preceding embodiment can be denoted by the same reference numerals or the reference numerals can be omitted, and the detailed descriptions thereof can also be omitted.

Referring to FIG. 17, according to still another one of various embodiments of the present disclosure, an antenna device 803 can include a circuit board 831, radiators 852, electric conductors 855 and 856, and an additional radiator 857.

The electric conductors 855 and 856 can be electrically connected to each other through the circuit board 831 so as to be utilized as a second radiator. That is, the second radiator, which is formed of the electric conductors 855 and 856, can be provided with the second feeding signal to transmit/receive a wireless signal in the second frequency band.

The additional radiator 857 can be mounted on one 856 of the electric conductors to be provided on the circuit board 831. The additional radiator 857 can be formed of an electrically conductive material, and thus, can be manufactured as a module having a spiral structure. The additional radiator 857 having the spiral structure is capable of increasing the physical length of a second radiator that is constituted with the electric conductors 855 and 856, thereby adjusting the second frequency band of the second radiator.

As described above, according to various embodiments of the present disclosure, an antenna device can include a circuit board, radiators disposed on the circuit board, and provided with a first feeding signal to transmit/receive a wireless signal in a first frequency band, and a ground disposed on the circuit board to provide a reference potential for the radiators. The radiators and the whole or a portion of the ground are provided with an additional feeding signal to transmit/receive a wireless signal various frequency bands that are lower than the first frequency band.

According to various embodiments, some of the radiators can form an inductive or capacitive coupling with the ground, and when the additional feeding signal is provided, the ground and some of the radiators, which form the inductive or capacitive coupling with the ground, can transmit/receive a wireless signal in a second frequency band that is lower than the first frequency band.

According to various embodiments, the antenna device can further include an additional radiator that extends from the ground.

According to various embodiments, the additional radiator can include a printed circuit pattern formed on the circuit board.

According to various embodiments, the antenna device can further include gaps between the radiators, and electric conductors that are provided in the gaps, respectively.

According to various embodiments, the radiators can be connected to the ground or provided with an additional feeding signal to transmit/receive a wireless signal in a second frequency band that is lower than the first frequency band.

According to various embodiments, the antenna device can further include a controller connected to each of the electric conductors, and first switches each provided between each of the electric conductors and the controller.

The controller can adjust the second frequency band formed in the ground and the electric conductors by controlling the first switches to adjust feeding to each of the electric conductors.

According to various embodiments, the electric conductors can be connected to the ground, and when the second feeding signal is provided, the electric conductors can transmit/receive a wireless signal in the second frequency band while forming an inductive or capacitive coupling with the ground.

According to various embodiments, the circuit board can include a plurality of via holes formed in each of layers, and the electric conductors can be formed by a combination of conductive materials filled in the via holes of different layers.

According to various embodiments, the antenna device can further include a coupling feeding circuit board that faces the conductors. The coupling feeding circuit board can feed power to the electric conductors by being provided with the second feeding signal.

According to various embodiments, the ground can include a plurality of parts that are electrically independent from each other, and the antenna device can further include second switches that connect the plurality of parts in series or in parallel.

According to various embodiments, the second frequency band formed through the ground can be adjusted according to ON/OFF of the second switches.

According to various embodiments of the present disclosure, an electronic device can include: a housing; a main circuit board provided in the housing; and an antenna device provided in the housing. The antenna device can include: a circuit board; radiators disposed on the circuit board, and provided with a first feeding signal to transmit/receive a wireless signal in a first frequency band; and a ground disposed on the circuit board to provide a reference potential for the radiators. The radiators and a whole or a portion of the ground can be provided with an additional feeding signal to transmit/receive a wireless signal in various frequency bands that are lower than the first frequency band.

According to various embodiments, the circuit board can be disposed on the main circuit board.

According to various embodiments, an electronic device that can include: a second ground provided on the main circuit board to face the ground; a connection part that connects the ground and the second ground to each other; and a feeding unit that provides a power across a slot formed between the ground and the second ground.

According to various embodiments, the ground may be disposed on a rear face or a side face of the circuit board, and the radiator may be disposed on a top face or a side face of the circuit board.

According to various embodiments, the second ground faces the ground disposed on the rear face of the circuit board, and one side face of the slot may be closed by the connection part.

In addition, according to various embodiments of the present disclosure, an antenna device may include: first radiators having a first length and each provided with a first signal to communicate a wireless signal in a first frequency band; and second radiators having a length that is longer than the first length, and provided with a second feeding signal to communicate a wireless signal in a second frequency band that is lower than the first frequency band. The first radiators may be arranged to follow the second radiators, respectively.

According to various embodiments, the first radiators may be arranged to be spaced apart from the second radiators.

According to various embodiments, the second radiators may provide a reference potential for the first radiators.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An antenna device, comprising:

a circuit board;

a ground disposed on the circuit board;

first radiators disposed on the circuit board; and second radiators spaced apart from the ground, wherein, the first and second radiators are configured to, together, transmit in a first frequency band, and the second radiators are configured to transmit in a second frequency band, wherein the first and second radiators, when provided with a first feeding signal from a first communication circuit and when provided with a reference potential by the ground, transmit and/or receive a first wireless signal in the first frequency band, wherein the second radiators, when provided with a second feeding signal from a second communication circuit, transmit and/or receive a second wireless signal in the second frequency band, and wherein the ground is electrically coupled to at least some of the second radiators to transmit or receive the second wireless signal in the second frequency band.

2. The antenna device of claim 1, wherein the ground is capacitively coupled to at least some of the second radiators.

3. The antenna device of claim 1, wherein the ground is formed in a plurality of parts, the parts selectively connected in series or in parallel.

4. The antenna device of claim 3, wherein, when the parts are connected in series, the ground has a length that is longer than a length of radiators within the second radiators.

5. The antenna device of claim 3, wherein at least some of the parts of the ground transmit or receive the second wireless signal in the second frequency band when the second feeding signal is received by the second radiators.

6. The antenna device of claim 1, wherein the first radiators are disposed on a first face of the circuit board and the ground is disposed on a second face of the circuit board.

7. The antenna device of claim 6, wherein the first face is a top face and the second face is a side face, and wherein the second radiators are disposed at a side of the ground.

8. The antenna device of claim 1, wherein the first frequency band is a mmWave frequency band.

9. The antenna device of claim 1, wherein the first radiators are arranged in a two-dimensional array.

* * * * *